United States Patent [19]

Resconi et al.

[11] Patent Number: 6,034,196

[45] Date of Patent: Mar. 7, 2000

[54] SUPER RANDOM COPOLYMERS OF ETHYLENE WITH OLEFINIC MONOMERS

[75] Inventors: Luigi Resconi; Tiziano Dall'Occo, both of Ferrara; Fabrizio Piemontesi, Borgosesia; Floriano Guglielmi, Ferrara; Enrico Albizzati, Arona, all of Italy

[73] Assignee: Montell Technology Company BV, Netherlands

[21] Appl. No.: 08/963,534

[22] Filed: Nov. 3, 1997

Related U.S. Application Data

[63] Continuation of application No. 08/737,000, Oct. 25, 1996, abandoned, which is a continuation of application No. 08/595,511, Feb. 1, 1996, abandoned, which is a continuation of application No. 08/436,647, May 8, 1995, abandoned, which is a continuation of application No. 08/126,328, Sep. 24, 1993, abandoned, which is a continuation-in-part of application No. 08/079,133, Jun. 18, 1993, abandoned.

[30] Foreign Application Priority Data

| Jun. 18, 1992 | [IT] | Italy | MI92A1498 |
| Jun. 18, 1992 | [IT] | Italy | MI92A1497 |
| Sep. 24, 1992 | [IT] | Italy | MI92A2179 |
| Sep. 24, 1992 | [IT] | Italy | MI92A2180 |

[51] Int. Cl.$^7$ .............. C08F 210/16; C08F 4/643
[52] U.S. Cl. .............. 526/348.3; 526/127; 526/160; 526/336; 526/339; 526/348.2; 526/348.4; 526/348.5; 526/348.6; 526/943
[58] Field of Search .............. 526/348.2, 348.4, 526/348.5, 348.6, 127, 160, 943, 348.3, 336, 339

[56] References Cited

U.S. PATENT DOCUMENTS

| 4,981,760 | 1/1991 | Naito et al. | 428/523 |
| 5,026,797 | 6/1991 | Takahashi | 526/124 |

FOREIGN PATENT DOCUMENTS

| 384171 | 8/1990 | European Pat. Off. |
| 452 920 A2 | 10/1991 | European Pat. Off. |

*Primary Examiner*—Fred Teskin
*Attorney, Agent, or Firm*—Bryan Cave LLP

[57] ABSTRACT

Copolymers of ethylene with comonomers selected from (a) alpha-olefins, (b) cycloolefins and/or (c) dienes, characterized by the fact that:

the molar percentage of the comonomer (% α) and the density of the copolymer (D) satisfy the relation % $\alpha + 150D \leq 141$.

11 Claims, No Drawings

SUPER RANDOM COPOLYMERS OF ETHYLENE WITH OLEFINIC MONOMERS

This is a continuation of U.S. application Ser. No. 08/737,000, filed Oct. 25, 1996, now abandoned which is a continuation of Ser. No. 08/595,511, filed Feb. 1, 1996, now abandoned which is a continuation of U.S. application Ser. No. 08/436,647, filed May 8, 1995, now abandoned, which is a continuation application of U.S. application Ser. No. 08/126,328, filed Sep. 24, 1993, now abandoned, which is a continuation-in-part of U.S. application Ser. No. 08/079,133, filed Jun. 18, 1993, now abandoned.

The present invention relates to ethylene copolymers, characterized by an extremely dispersed distribution of comonomers, a process for the preparation of the mentioned ethylene copolymers and the catalytic system used in said process.

It is known that polyethylene can be modified, during the polymerization reaction, by addition of small amounts of alpha-olefins, generally 1-butene, 1-hexene or 1-octene. LLDPE copolymers (linear low density polyethylene) are obtained which show branching along the main chain due to the alpha-olefinic comonomers.

The percentage of the incorporated alpha-olefin affects the degree of crystallinity and, consequently, the density of the copolymer. Typically, the LLDPE polyethylene has density of the order of 0.915–0.940 g/cm$^3$ and, for density of 0.915 g/cm$^3$, the alpha-olefin content is higher than 5% by mol.

The properties of the copolymer, besides the type and amount of the incorporated alpha-olefinic comonomer, also depend on the distribution of branching along the polymeric chains. In particular, the higher distribution homogeneity of branching has a positive effect on the characteristics of films obtained from the copolymers.

LLDPE copolymers prepared with conventional Ziegler-Natta catalysts are characterized by poorly dispersed composition, and in particular by the presence of consecutive units of the comonomers in the polymeric chain. Therefore, in order to obtain copolymers endowed with low enough density and crystallinity, it is necessary to use high amounts of alpha-olefinic comonomer.

The use of homogeneous catalysts based on metallocene compounds has allowed LLDPE copolymers endowed with improved composition dispersity to be obtained. These copolymers are endowed with properties better that those of traditional copolymers, chemical composition being equal.

European Patent application No. 452920, for example, describes "random" copolymers of ethylene with an alpha-olefin endowed with close composition distribution and improved "melt tension". Said copolymers are prepared using a catalyst which comprises the product of the prepolymerization reaction of the olefin with:

[A] a solid support,

[B] a metallocene compound of a transition metal of the group IVB of the Periodic Table of Elements comprising cyclopentadienyl groups not connected to each other,

[C] a metallocene compound of a transition metal of the group IVB of the Periodic Table of Elements comprising two cyclopentadienyl groups connected to each other by a bridge group,

[D] an allumoxane compound, and optionally,

[E] an organometallic compound of aluminium.

As component [C], ethylene bis-indenyl zirconium dichloride has been used.

However, in LLDPE copolymers obtainable by the processes known at the date of the present invention, the regularity in the comonomer distribution in the polymeric chain does not reach a high level.

The ethylene copolymers, object of the present invention, comprise units deriving from ethylene and units deriving from at least a comonomer selected from:

(a) alpha-olefins of the formula $CH_2=CH-CH_2R$, wherein R is hydrogen or a straight, branched or cyclic alkyl radical containing from 1 to 20 atoms, (b) cycloolefins, and (c) polyenes, having a content of ethylene units comprised between 80 and 99% by mol, content of units deriving from alpha-olefin, cycloolefin and/or polyene comonomers comprised between 1 and 20% by mol, and are characterized by the fact that the molar percentage of the alpha-olefinic comonomer (% α) and the density of the copolymer (D) satisfy the relation:

% α+150D≦141, preferably % α+150D≦140.5 and more preferably % α+150D≦140

The analysis of the comonomer distribution in the copolymer, and in particular of 1-butene in ethylene/1-butene copolymers is carried out by $^{13}$C-N.M.R. as described in macromolecular (1982), 15, 353–360.

Cluster Index is used, which is defined as:

$$C.I.=1-([EXE]_{obs}-[EXE]_{bern})/([X]-[EXE]_{bern})$$

wherein

[X] is the molar fraction of alpha-olefinic comonomer in the copolymer,

[EXE]$_{obs}$ is the normalized experimental concentration of sequences ethylene/alpha-olefin/ethylene in the copolymer,

[EXE]$_{bern}$ by is the normalized concentration of sequences ethylene/alpha-olefin/ethylene in a random copolymer (or bernoulian), that is:

$$[EXE]_{bern}=[X].(1-[X])^2$$

[X] and [EXE] are calculated as follows:

$$[X]=2\,(2A+2B-D-\beta\beta)/(A+C+3C+4D+\beta\beta)$$

$$[EXE]=2\,(B+D+\beta\beta-2A)/(A+B+3C+4D+\beta\beta)$$

wherein A, B, C, D and ββ are the experimental surfaces of the peaks of the NMR spectrum as defined in the paper mentioned above.

When C.I.>1 the copolymer is a block copolymer, when C.I.=1 this is a "random" copolymer, when C.I.<1 this is a "super-random" copolymer.

"Super random" copolymers are characterized by an extremely dispersed distribution of the comonomers along the polymeric chain and, more particularly, by the fact that they contain an extremely low number of sequences of two or more equally consecutive units of comonomer, lower than that of a "random" copolymer.

Furthermore, the copolymers according to the invention are characterized by relatively low values of the solubility in xylene at 25° C. (lower than 2% by weight for a content of alpha-olefinic comonomer up to 10% by weight).

Examples of alpha-olefins of the formula $CH_2=CH-CH_2R$ useable as comonomers are propylene, 1-butene, 1-pentene, 4-methyl-1-pentene, 1-hexene, 1-octene, 4,6-dimethyl-1-heptene, 1-decene, 1-dodecene, 1-tetradecene, 1-hexadecene, 1-octadecene, 1-eicosene and allylcyclohexane.

In the particular case wherein the alpha-olefinic comonomer is 1-butene, the percentage by weight of 1-butene (% B) and the density of the copolymer (D) satisfy the relation:

% B+300D≦282.

Examples of cycloolefins are cyclopentene, cyclohexene and norbornene.

The copolymers can also contain units deriving from polyenes, in particular from conjugated or non-conjugated, linear or cyclic dienes, such as for example 1,4-hexadiene, isoprene, 1,3-butadiene, 1,5-hexadiene, 1,6-heptadene.

In the case of polyenes different from non conjugated α, ω-diolefins containing 6 or more carbon atoms, they are preferably used in amounts comprised between 0 and 3% by mol as second alpha-olefinic comonomer.

The ethylene copolymers according to the present invention can be prepared by the copolymerization reaction of ethylene with at least one comonomer selected from alpha-olefins of the formula $CH_2=CH-CH_2R$, wherein R is hydrogen or a straight, branched or cyclic alkyl radical containing from 1 to 20 carbon atoms, cycloolefins and/or polyenes, said process being carried out in the presence of catalyst systems obtained from the product of the reaction between:

(A) a zirconocene of the general formula $XR^1{}_2C_5R^1{}_4)_2ZrQ^1Q^2$ wherein X is a carbon, silicon or germanium atom; substituents $R^1$, same or different from each other, are alkyl radicals containing from 1 to 7 carbon atoms; $C_5R^1{}_4$ is a substituted cyclopentadienyl ring; $XR^1{}_2$ bridge links the two cyclopentadienyl rings $C_5R^1{}_4$; $Q^1$ and $Q^2$, same or different from each other, are hydrogen, halogen or $R^1$; and (B) the product of the reaction between water and an organometallic aluminium compound of the formula $AlR^2{}_{3-z}H_z$, wherein substituents $R^2$, same or different from each other, are alkyl, alkenyl or alkylaryl radicals containing from 1 to 10 carbon atoms which can also contain Si or Ge atoms, with the provisio that at least one of substituents $R^2$ is different from a straight chain alkyl group and z is 0 or 1.

The molar ratio between the organometallic aluminium compound and water is higher than 1:1 and lower then about 100:1.

The preferred molar ratio is higher than about 2:1 and lower than about 50:1.

The molar ratio between the aluminium and zirconium is comprised between about 100 and 5000, and preferably between about 500 and 2000.

The polymerization reaction according to the invention can be carried out in liquid phase, optionally in the presence of an inert hydrocarbon solvent, or in the gas phase.

A remarkable operative advantage of the process of the present invention resides in the fact that it can be suitably carried out in liquid phase without using an aromatic solvent such as toluene.

As a matter of fact, the copolymerization reaction can be carried out in the presence of aliphatic or alicyclic hydrocarbon solvents. Good results are obtained by working, for example, in liquid propane.

In particular, it is favourable working in the presence of the comonomer itself in the liquid state; this can be, for example, butene. This is possible owing to the peculiarity of the catalyst systems according to the present invention that, being characterized by comparatively low reactivities towards the alpha-olefinic comonomers, allow working in liquid comonomer and to obtain copolymers endowed with good morphological and physical properties.

The most preferred zirconocene compound is the dimethylsilandiyl-bis(tetramethylcyclopentadienyl) zirconium dichloride.

Preferably, all the substituents $R^2$ of the organometallic aluminium compound are non linear alkyl, alkenyl or alkylaryl radicals. More preferably, all the substituents $R^2$ of the organometallic aluminium compound are isoalkyl radicals.

Particularly preferred compound is the triisobutyl aluminium (TIBAL).

A particular reaction product of TIBAL with water, which can be suitably used such as catalyst component (B), is the tetraisobutyl alumoxane (TIBAO).

The alkyl aluminium compound can be reacted with water in different manners. It is possible, for example, to add the water gradually to the alkyl aluminium compound in solution in an inert aliphatic or aromatic hydrocarbon solvent such as, for example, heptane or toluene. According to another embodiment way, the water can be introduced into the monomer or one of the monomers to be polymerized; in this case the alkyl aluminium compound and the metallocene are precontacted before being used in the polymerization. Again, the water can be reacted in combined form as hydrated salt, or it can be adsorbed or absorbed on an inert support, such as silica. Another preparation method is the reaction of the alkyl aluminium with boric anhydride or with boric acid.

The catalysts used in the process of the present invention can be also used on inert supports. This is obtained by depositing the metallocene compound, or the product of the reaction of the same with the alkyl aluminium pre-reacted with water, or the aluminium alkyl compound pre-reacted with water and thereafter the metallocene compound, on inert supports such as for example silica, alumina, styrene-divinylbenzene copolymers or polyethylene.

The solid compound thus obtained, in combination with a further addition of alkyl aluminium compound either as such or pre-reacted with water, if necessary, is usefully used in the gas phase polymerization.

The polymerization temperature is generally comprised between 0° C. and 250° C., and in particular between 20° C. and 150° C., and more particularly between 40° C. and 90° C.

The molecular weight of the copolymers can be simply changed varying the polymerization temperature, the type or concentration of the catalytic components or using molecular weight regulators such as, for example, hydrogen.

The molecular weight distribution can be varied using mixtures of different metallocenes, or carrying out the polymerization in many steps which differ in the polymerization temperatures and/or the concentration of the molecular weight regulator.

Particularly interesting results are obtained when the components of the catalyst are contacted with each other before the polymerization. The contact time is generally comprised between 1 and 60 minutes, preferably between 5 and 20 minutes.

The pre-contact concentrations for the metallocene compound are comprised between $10^{-2}$ and $10^{-8}$ mol/l, whereas for the product of the reaction between the alkyl aluminium and the water are between 10 and $10^{-3}$ mol/l. The pre-contact is generally carried out in the presence of a hydrocarbon solvent and, optionally, small amounts of monomer.

The following examples are given to illustrate and not to limit the invention.

Characterization

The intrinsic viscosity (I.V.) has been measured in tetrahydronaphtalene at 135° C.

The Melt Index (MI) has been measured under the following conditions:
Condition E ($I_2$, ASTM D-1238) at 190° C. with a 2.16 kg load;
Condition F ($I_{21}$, ASTM D-1238) with a 21.6 kg load;
the Melt Flow Ratio (MFR) is equal to $I_{21}/I_2$.

The percentage by weight of comonomers in the copolymer is determined according to Infra-Red (IR) techniques.

The real density has been measured according to the ASTM D-1505 method by deeping of an extruded polymer sample in a density gradient column.

The Differential Scanning Calorimetry (DSC) measurements have been carried out on a DSC-7 apparatus of Perkin Elmer Co. Ltd., according to the following procedure. About 10 mg of sample are heated to 200° C. with a scanning speed equal to 20° C./minute; the sample is kept at 200° C. for 5 minutes and thereafter is cooled with a scanning speed equal to 20° C./minute. A second scanning is then carried out according to the same modalities as the first one. Values reported are those obtained in the second scanning.

The solubility in xylene at 25° C. has been determined according to the following modalities. About 2.5 g of polymer and 250 ml of xylene are placed in a round-bottomed flask provided with cooler and reflux condenser, kept under nitrogen head. This is heated to 135° C. and is kept stirred for about 60 minutes. This is allowed to cool under stirring to 25° C.

The whole is filtered off and after evaporation of the solvent from the filtrate until a constant weight is reached, the weight of the soluble portion is calculated.

The $^{13}$C-N.M.R. analysis of the polymers have been carried out using a Bruker 200 MHz apparatus, using $C_2D_2Cl_4$ as solvent at a temperature of 110° C.

The catalyst component (A) has been synthetized as follows:
Synthesis of [(Dimethylsilandiyl)Bis(2,3,4,5 Tetramethylcyclopentadienyl)] Zirconium Dichloride- MeSi $(Me_4Cp)_2ZrCl_2$ a) Preparation of Tetramethylcyclopentadiene Into a 1 liter 5-necked glass round-bottomed flask, equiped with mechanical stirrer, cooler, thermometer, dropping funnel and nitrogen inlet tap, 3.8 g (99.6 mmol) of $LiAlH_4$ and 200 ml of anhydrous ethyl ether were fed under nitrogen stream.

The temperature was brought to 0° C. and 43.55 g (315 mmol) of 2,3,4,5-tetramethyl-cyclopenten-1-one (Aldrich) were added dropwise over 1 hour under stirring and slight nitrogen stream. Thereafter the whole was left to return to room temperature and was kept stirred for further 40 hours.

The flask was cooled to 0° C. on a ice bath and very slowly 100 ml of water and then 100 ml of 10% sulfuric acid were added: separation in two layers was obtained.

The aqueous layer was extracted three times with ether, the organic phases were collected, washed first with a saturated solution of sodium bicarbonate and then with water and dried on anhydrous sodium sulfate.

After filtration the ether solution was concentrated to 700 ml and transferred into a 1 liter round-bottomed flask provided with mechanical stirrer and cooler with 6.15 g (32.3 mmol) of p-toluensulfonic acid monohydrate. This was kept under stirring for 3 hours at room temperature.

The aqueous layer formed on the bottom was removed, the ether phase was washed with 50 ml of saturated sodium bicarbonate solution and thereafter with water. This was dried on anhydrous sodium sulfate and after filtration the ether was wholly evaporated: 26.8 g of tetramethylcyclopentadiene (purity=90%, yield 85%) were obtained. Characterized by $^1$H-NMR.

b) Preparation of Dimethyl Bis (Tetramethylcyclopentadienyl) Silane

Into a 2 liter 5-necked glass round-bottomed flask, provided with mechanical stirrer, cooler, thermometer, dropping funnel and nitrogen inlet tap, 32 g (262 mmol) of tetramethylcyclopentadiene and 1200 ml of anhydrous tetrahydrofuran were fed.

The temperature was brought to 0° C. and 165 ml of n-butyllithium (1.6 M in hexane, 264 mmol) were added dropwise over one and a half hours.

The whole was kept under stirring for a further 10 hours allowing it to return to room temperature.

Thereafter, 17 g (132 mmol) of dichlorodimethylsilane dissolved in 80 ml of anhydrous tetrahydrofuran were added dropwise over one hour at room temperature; at the completion of the addition this was kept under reflux for 5 days thus obtaining at the end an almost clear solution. The tetrahydrofuran was removed by evaporation under vacuum and the residue was extracted with 200 ml of petroleum ether (b.p. 40–70° C.). After filtration and evaporation of the solvent under vacuum, 36.95 g of dimethylbis(2,3,4,5-tetramethylcyclopentadienyl) silane were recovered. Characterized by $^1$H-NMR.

c) Preparation of $Me_2Si(Me_4Cp)_2ZrCl_2$

The preparation described in: Jutzi, P.; Dickbreder, R.; Chem. ber., 1986, 119. 1750–1754 has been followed.

All the operations were carried out in inert atmosphere.

A solution of 9.26 g (30.81 mmol) of dimethylbis(2,3,4,5-tetramethyl-cyclopentadienyl) silane in 170 ml of anhydrous tetrahydrofuran was treated at 0° C. with 40.5 ml of butyllithium 1.6M in hexane. This was kept under stirring for 16 hours at the same temperature, thereafter this was allowed to return to room temperature and the stirring was continued for one hour.

After having evaporated the solvent, the residue was washed twice with 50 ml of hexane and once with pentane. It was dried, thus obtained 7.85 g of lithium salt [$Me_2Si(Me_4C_5)_2Li_2$, (1)].

5.98 g of (1) were dissolved in 80 ml of anhydrous tetrahydrofuran and added (at 0° C. and dropwise) to a suspension of 7.22 g of $ZrCl_4 \cdot 2THF$ in 80 ml of tetrahydrofuran.

The whole was heated under reflux for 2 hours, was left to stand overnight at room temperature and thereafter the solvent was wholly evaporated. The residue was extracted twice with 70 ml of hot toluene (about 80° C.) and the solution was allowed to crystallize at −30° C.

By filtration 1.3 g (14.7%) of crystalline product was obtained. The purity has been verified by $^1$H NMR.

The catalyst component (B) has been synthetized as follows:
Synthesis of Tetraisobutylallumoxane (Tibo)

The procedure indicated in example 2 of the European Patent application No. 384.171 has been followed.

EXAMPLES 1–2

In a 4.25 l. steel autoclave equipped with blade stirrer, 2.1 l of 1-butene were introduced under anhydrous nitrogen atmosphere. The temperature was raised to 50° C. and a toluene solution of TIBAO and $Me_2Si(Me_4Cp)_2ZrCl_2$, precontacted for 5 minutes in the absence of monomers was introduced. Thereafter ethylene and hydrogen was fed and the pressure of these gases was kept constant for the whole test, carried out under stirring at 50° C.

After removal of the unreacted monomers, the polymer was separated by washing with methanol and drying under vacuum.

The amounts of the used reagents, the duration of the reaction, the copolymer yield and the activity of the catalyst are indicated in Table 1. The characterization of the copolymers obtained is reported in table 2.

EXAMPLE 3–4

The examples were carried out according to example 1, but with the difference that the stirring in the autoclave was of the helical type.

The reaction conditions are indicated in table 1. The characterization of the obtained copolymer is reported in table 2.

EXAMPLE 5

The example was carried out according to example 3, but with the difference that the zirconocene compound was fed with subsequent additions of ¼, ¼ and ½ of the total amount.

The reaction conditions are indicated in table 1. The characterization of the obtained copolymer is reported in table 2.

EXAMPLE 6

The example was carried out according to example 3, but with the difference that TIBAO was fed with subsequent additions of ½, ⅙, ⅙ and ⅙ of the total amount and the zirconocene compound with four subsequent additions of ¼ of the total amount.

The reaction conditions are indicate in Table 1. The characterization of the obtained copolymer is reported in Table 2.

EXAMPLE 7

The example was carried out according to example 3, but with the difference that instead of TIBAO a mixture of TIBAL/$H_2O$ in molar ratio equal to 10 was used.

The reaction conditions are indicated in Table 1. The characterization of the obtained copolymer is reported in table 2.

EXAMPLE 8

The example was carried out according to example 7, but with the difference that a mixture of TIBAL/$H_2O$ in molar ratio equal to 2 was used.

The reaction conditions are indicated in Table 1. The characterization of the obtained copolymer is reported in Table 2.

From the NMR analysis of the copolymer, the following values were obtained:

$[X]=0.0411$; $[EXE]_{obs}=0.0380$; $[EXE]_{bern}=0.0378$; C.I.=0.94

Examples 9–11

Into a 22 l steel autoclave equipped with helical stirrer, 12.2 l of 1-butene were introduced; the temperature was brought up to 50° C. and a toluene solution of TIBAO and $Me_2Si(Me_4Cp)$ $ZrCl_{21}$ precontacted for 5 minutes in the absence of monomers was introduced.

TIBAO was fed with a first addition of ½ of the total amount and with further six subsequent additions of 1/12, whilst the zirconocene compound with six subsequent additions of ⅙ of the total amount.

Thereafter, ethylene and hydrogen was fed and the pressure of these gases was kept constant for the whole duration of the test, carried out keeping under stirring at 50° C.

After removal of the unreacted monomers, the polymer was separated by washing with methanol and drying under vacuum.

The reaction conditions are indicated in Table 1. The characterization of the obtained copolymer is reported in table 2.

EXAMPLE 12

The example was carried out according to the example 3, but with the difference that the reaction was carried out in liquid propane (1.8 l).

The reaction conditions are indicated in Table 1. The characterization of the obtained copolymer is reported in Table 2.

Comparison Examples

Working according to example 3, but with the difference that instead of $Me_2Si(Me_4CP)_2ZrCl_2$, ethylene-bis (tetrahydroindenyl) zirconium dichloride was used.

The reaction conditions are indicated in Table 1. The characterization of the obtained copolymer is reported in table 2.

From the analysis of the results obtained in the examples described above, it is clear that the ethylene copolymers according to the present invention, owing to the extremely regular distribution of the comonomeric units along the polymeric chain, show very good properties at comparatively low contents of alpha-olefinic comonomers.

In particular, under the same alpha-olefinic comonomer, the crystallinity degree and therefore the density of the copolymers according the present invention is undoubtedly inferior in comparison to the copolymers known till now.

As a matter of fact, whilst in known LLDPE copolymers, in order to reach densities of the order of about 0.92 g/cm$^3$ a content of 1-butene of about 6–8% is necessary, the above mentioned density values are reached according to the present invention for copolymers having a 1-butene content of about 3–5%. If the 1-butene content raises to about 7%, copolymers with density values of about 0.91 g/cc (Example 9) are obtained.

Therefore the present invention allows LLDPE copolymers having low values of density, crystallinity degree and melting temperature to be obtained using the minimum of alpha-olefinic comonomers.

TABLE 1

| Example | Zr (mmol. 10⁻³) | Al (mmol.) | Al toluene (ml.) | Al/Zr (mol. ratio) | press. C₂ (bar) | press. H₂ (bar) | t (min) | yield (g) | activity (g_pol/g_Zr/h) |
|---|---|---|---|---|---|---|---|---|---|
| 1 | 3.90 | 6.0 | 6.7 | 1538 | 13.8 | 0.25 | 180 | 113 | 105800 |
| 2 | 2.61 | 3.9 | 7.5 | 1497 | 10.2 | 0.15 | 120 | 112 | 235700 |
| 3 | 2.61 | 3.9 | 7.5 | 1497 | 8.0 | 0.15 | 120 | 78 | 164100 |
| 4 | 5.21 | 3.9 | 7.5 | 749 | 8.0 | 0.15 | 120 | 83 | 87300 |
| 5 | 5.21 | 3.9 | 37 | 749 | 8.0 | 0.15 | 180 | 81 | 56800 |
| 6 | 5.21 | 3.9 | 37 | 749 | 8.0 | 0.15 | 180 | 266 | 186600 |
| 7 | 2.61 | 7.8 | 7.5 | 2994 | 8.0 | 0.15 | 120 | 187 | 393500 |
| 8 | 2.17 | 6.5 | 7.5 | 2994 | 8.0 | 0.16 | 120 | 207 | 522700 |
| 9 | 31.24 | 19.4 | 90 | 621 | 8.0 | 0.15 | 240 | 1700 | 149000 |
| 10 | 31.24 | 19.4 | 90 | 621 | 8.0 | 0.15 | 240 | 1630 | 142900 |
| 11 | 31.24 | 19.4 | 90 | 621 | 8.0 | 0.15 | 240 | 2130 | 186700 |
| 12 | 5.21 | 7.8 | 9.5 | 1498 | 6.1 | 0.12 | 240 | 90 | 47500 |
| COMP. 1 | 4.68 | 3.5 | 7.5 | 1493 | 8.0 | 0.15 | 120 | 265 | 285000 |

TABLE 2

| Example | I.V. (dl/g) | Melt Index I₂ (g/10') | Melt Index I₂₁ (g/10') | MFR | 1-butene (% b.w.) | Real density (g/ml) | DSC Tm(II) (° C.) | DSC ΔH_f (J/g) | solubility xylene-25° C. (% by w.) |
|---|---|---|---|---|---|---|---|---|---|
| 1 | 1.37 | 6.2 | 106 | 17.1 | 4.7 | 0.9233 | 118 | 128 | 1.5 |
| 2 | 2.64 | 0.24 | 3.8 | 16.0 | 3.1 | 0.9215 | 120 | 125 | 0.2 |
| 3 | 2.29 | 0.50 | 7.8 | 15.6 | 4.2 | 0.9205 | 116 | 120 | 0.4 |
| 4 | 2.07 | 0.91 | 13.8 | 15.1 | 4.5 | 0.9208 | 118 | 91 | 0.4 |
| 5 | 2.11 | 0.96 | 16.8 | 17.5 | 3.6 | 0.9144 | 116 | 124 | 0.3 |
| 6 | 2.04 | 0.80 | 11.2 | 14.0 | 4.9 | 0.9172 | 114 | 120 | 0.3 |
| 7 | 2.11 | 0.40 | 6.7 | 16.9 | 6.2 | 0.9137 | 110 | 102 | 0.6 |
| 8 | 1.91 | 1.03 | 18.4 | 17.9 | 8.5 | 0.9092 | 108 | 85 | 0.2 |
| 9 | 1.67 | 1.92 | 29.5 | 15.4 | 7.3 | 0.9105 | 108 | 96 | 1.9 |
| 10 | 1.58 | 2.85 | 49.7 | 17.4 | 4.3 | 0.9192 | 112 | 114 | 0.2 |
| 11 | 1.95 | 0.88 | 13.0 | 14.8 | 5 | 0.9171 | 114 | 111 | 0.4 |
| 12 | 1.17 | 11.6 | 187 | 16.1 | 2.5 | 0.9313 | 122 | 145 | 0.4 |
| COMP. 1 | 3.7 | | 0.98 | | 15.4 | 0.8960 | 88.8 | | 11.8 |

We claim:

1. A super random copolymer of ethylene, said copolymer having in addition to ethylene units, at least one comonomer selected from the group consisting of:

(a) α-olefins having the formula $CH_2=CH-CH_2-R$, wherein R is hydrogen or a straight, branched or cyclic alkyl radical having from 1 to 20 carbon atoms, (b) cycloolefins, and (c) polyenes, said copolymer having a molar percentage content of ethylene units between 80 and 99% and a molar percentage content of units deriving from said α-olefin, cycloolefin and polyene comonomers of between 1 and 20%, said copolymer having a molar percentage of said α-olefin comonomer and a density such that said copolymer satisfies the following relationship:

$$\% \alpha + (150 \text{ cm}^3/\text{g} \times D) \leq [141]140$$

wherein % α represents the molar percentage of units derived from said α-olefins, and D represents the density of said copolymer in g/cm³, wherein said copolymer has a cluster index less than 1.

2. The copolymer of claim 1, wherein the α-olefin having the formula $CH_2=CH-CH_2R$ is selected from the group consisting of propylene, 1-butene, 1-hexene and 1-octene.

3. A copolymer according to claim 1, wherein said copolymer has a solubility in xylene less than 2% by weight at 25° C.

4. A super random copolymer having a cluster index less than 1 and a solubility in xylene less than 2% by weight at 25° C., which is obtained by a process for the preparation of copolymers of ethylene with at least one comonomer selected from the group consisting of α-olefins having the formula $CH_2=CH-CH_2-R$, wherein R is a straight, branched or cyclic alkyl radical having from 1 to 20 carbon atoms, cycloolefins, and polyenes, said process comprising copolymerizing ethylene with at least one of said comonomers in the presence of a catalyst system, said catalyst system being obtained from the product of the reaction between:

(A) a zirconocene of the formula $$XR^1{}_2(C_5R^1{}_4)_2ZrQ^1Q^2$$

wherein X is a carbon, silicon or germanium atom;
the $R^1$ substituents, which may be the same or different from each other, are alkyl radicals having from 1 to 7 carbon atoms;
$C_5R^1{}_4$ is a substituted cyclopentadienyl ring;
the group $XR^1{}_2$ bridge links said $C_5R^1{}_4$ rings;
$Q^1$ and $Q^2$, same or different from each other, are hydrogen, halogen or $R^1$; and (B) the product of the reaction between water and an organometallic aluminum compound of the formula $AlR^2{}_{3-Z}H_Z$, wherein the $R^2$ substituents, which may be the same or different from each other, are alkyl, alkenyl or alkylaryl radicals having from 1 to 10 carbon atoms, wherein one or more Si or Ge atoms may be substituted for one or more of said carbon atoms in the $R^2$ substituents, with the proviso that at least one of the $R^2$ substituents is different from a straight chain alkyl group, and wherein z is 0 or 1;

the molar ratio between the organometallic aluminum compound and water being higher than 1:1 and lower than about 100:1; and wherein the process is carried out in the presence of an aromatic hydrocarbon solvent.

5. A super random copolymer having a cluster index less than 1 and a solubility in xylene less than 2% by weight at 25° C. according to claim 4, wherein the process is carried out in the presence of toluene as the aromatic hydrocarbon solvent.

6. A super random copolymer according to claim 4, wherein the zirconocene compound of the process is dimethylsilandiyl-bis (tetramethylcyclopentadienyl) zirconium dichloride.

7. A super random copolymer according to claim 5, wherein the zirconocene compound of the process is dimethylsilandiyl-bis (tetramethylcyclopentadienyl) zirconium dichloride.

8. A super random copolymer according to claim 4, wherein the organometallic compound of the process is triisobutylaluminum.

9. A super random copolymer according to claim 5, wherein the organometallic compound of the process is triisobutylaluminum.

10. A super random copolymer having a cluster index less than 1 and a solubility in xylene less than 2% by weight at 25° C., which is obtained by a process for the preparation of copolymers of ethylene with at least one comonomer selected from the group consisting of α-olefins having the formula $CH_2=CH—CH_2—R$, wherein R is a straight, branched or cyclic alkyl radical having from 1 to 20 carbon atoms, cycloolefins, and polyenes, said process comprising copolymerizing ethylene with at least one of said comonomers in the presence of a catalyst system, said catalyst system being obtained from the product of the reaction between:

(A) a zirconocene of the formula

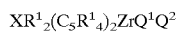

wherein X is a carbon, silicon or germanium atom;
the $R^1$ substituents, which may be the same or different from each other, are alkyl radicals
having from 1 to 7 carbon atoms;
$C_5R^1_4$ is a substituted cyclopentadienyl ring;
the group $XR^1_2$ bridge links said $C_5R^1_4$ rings;
$Q^1$ and $Q^2$, same or different from each other, are hydrogen, halogen or $R^1$; and (B) the product of the reaction between water and an organometallic aluminum compound of the formula $AlR^2{}_{3-Z}H_Z$, wherein the $R^2$ substituents, which may be the same or different from each other, are alkyl, alkenyl or alkylaryl radicals having from 1 to 10 carbon atoms, wherein one or more Si or Ge atoms may be substituted for one or more of said carbon atoms in the $R^2$ substituents, with the proviso that at least one of the $R^2$ substituents is different from a straight chain alkyl group, and wherein z is 0 or 1;

the molar ratio between the organometallic aluminum compound and water being higher than 1:1 and lower than about 100:1; and wherein the copolymerization is carried out in the presence of an aliphatic or alicyclic hydrocarbon solvent.

11. A super random copolymer having a cluster index less than 1 and a solubility in xylene less than 2% by weight at 25° C. according to claim 10, wherein the hydrocarbon solvent is selected from the group consisting of liquid propane and liquid butene.

* * * * *

UNITED STATES PATENT AND TRADEMARK OFFICE
CERTIFICATE OF CORRECTION

PATENT NO.   : 6,034,196
DATED        : March 7, 2000
INVENTOR(S)  : Resconi, et al.

It is certified that error appears in the above-identified patent and that said Letters Patent are hereby corrected as shown below:

In claim 1, column 9, line 56, change "[141]140" to --140--.

In claim 4, column 10, line 41, change, "25°C.." to --25°C.,--.

Signed and Sealed this

First Day of May, 2001

Attest:

NICHOLAS P. GODICI

*Attesting Officer*    *Acting Director of the United States Patent and Trademark Office*